United States Patent
Merdzo

(10) Patent No.: US 7,833,325 B2
(45) Date of Patent: Nov. 16, 2010

(54) SORPTION COLUMN

(75) Inventor: Edmund Merdzo, Munich (DE)

(73) Assignee: CS Clean Systems AG, Ismaning (DE)

( * ) Notice: Subject to any disclaimer, the term of this patent is extended or adjusted under 35 U.S.C. 154(b) by 226 days.

(21) Appl. No.: 11/787,802

(22) Filed: Apr. 18, 2007

(65) Prior Publication Data

US 2007/0245899 A1    Oct. 25, 2007

(30) Foreign Application Priority Data

Apr. 20, 2006    (DE)    ........................ 10 2006 018 252

(51) Int. Cl.
*B01D 53/12* (2006.01)
(52) U.S. Cl. .............................. 96/108; 96/116; 96/122; 96/136; 55/313; 55/348; 55/411; 55/420; 55/DIG. 35
(58) Field of Classification Search ................... 96/108, 96/116, 122, 136, 139, 147, 379; 55/309, 55/313, 347, 348, 355, 411, 417, 529, 505, 55/387, 418, 420, DIG. 33, DIG. 35, DIG. 9; 210/234, 235
See application file for complete search history.

(56) References Cited

U.S. PATENT DOCUMENTS

| 5,151,116 A | 9/1992 | Scholz et al. |
| 2004/0035777 A1* | 2/2004 | Stankowski et al. ......... 210/235 |

FOREIGN PATENT DOCUMENTS

EP    0 497 328 B1    8/1992

* cited by examiner

*Primary Examiner*—Jason M Greene
*Assistant Examiner*—Karla Hawkins
(74) *Attorney, Agent, or Firm*—Flynn, Thiel, Boutell & Tanis, P.C.

(57) ABSTRACT

A sorption column for waste-gas cleaning has a vat-shaped housing (1) for receiving a solid stationary sorbent, an inlet for waste gas to be cleaned into the housing (1) and an outlet for cleaned waste gas out of the housing (1). The housing circumferential wall (2) is provided in the area of the housing bottom (3) and the housing cover (4) in each case with a depression (9, 10) for receiving a ball valve (11) at the waste gas inlet or a ball valve (12) at the waste gas outlet.

23 Claims, 2 Drawing Sheets

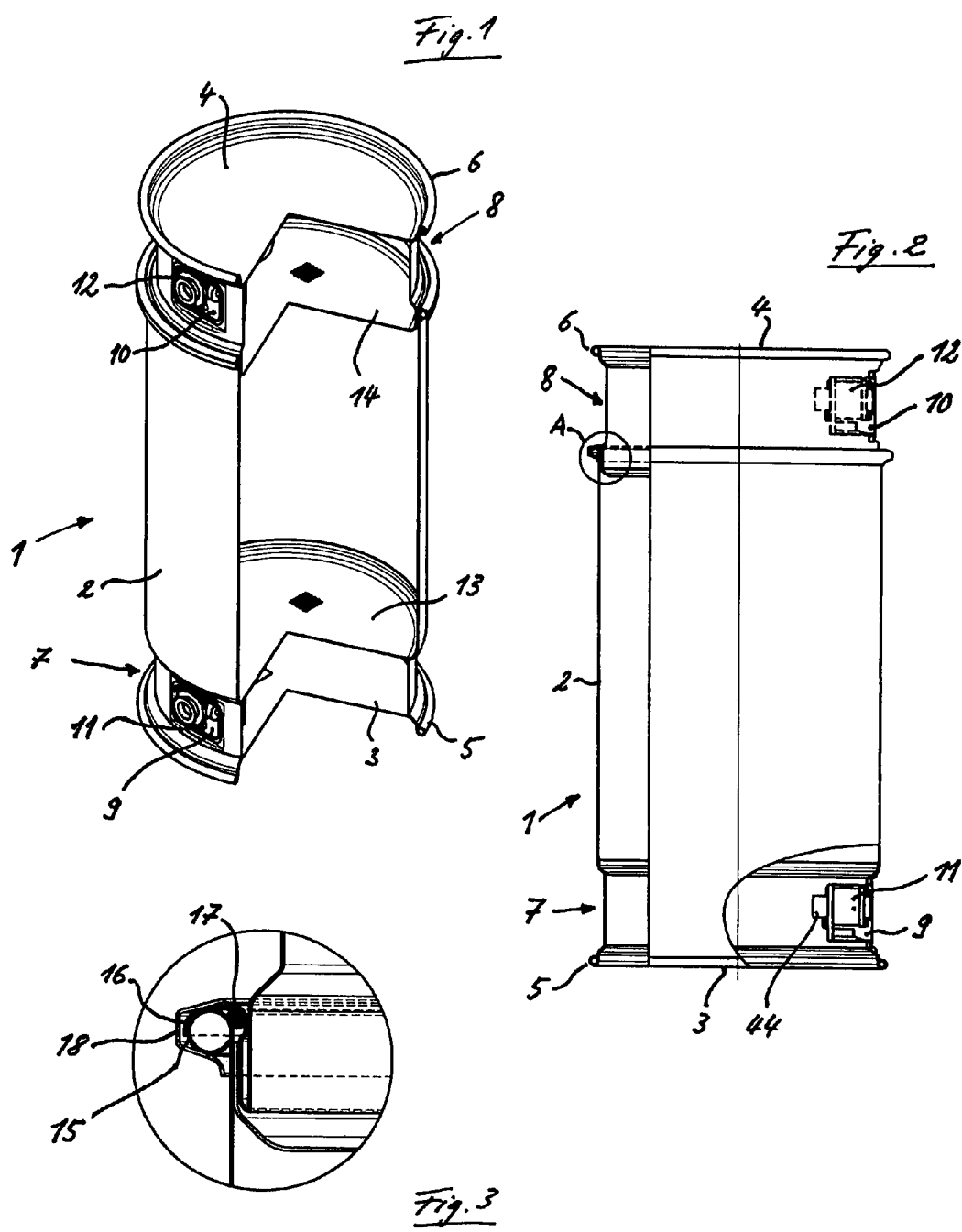

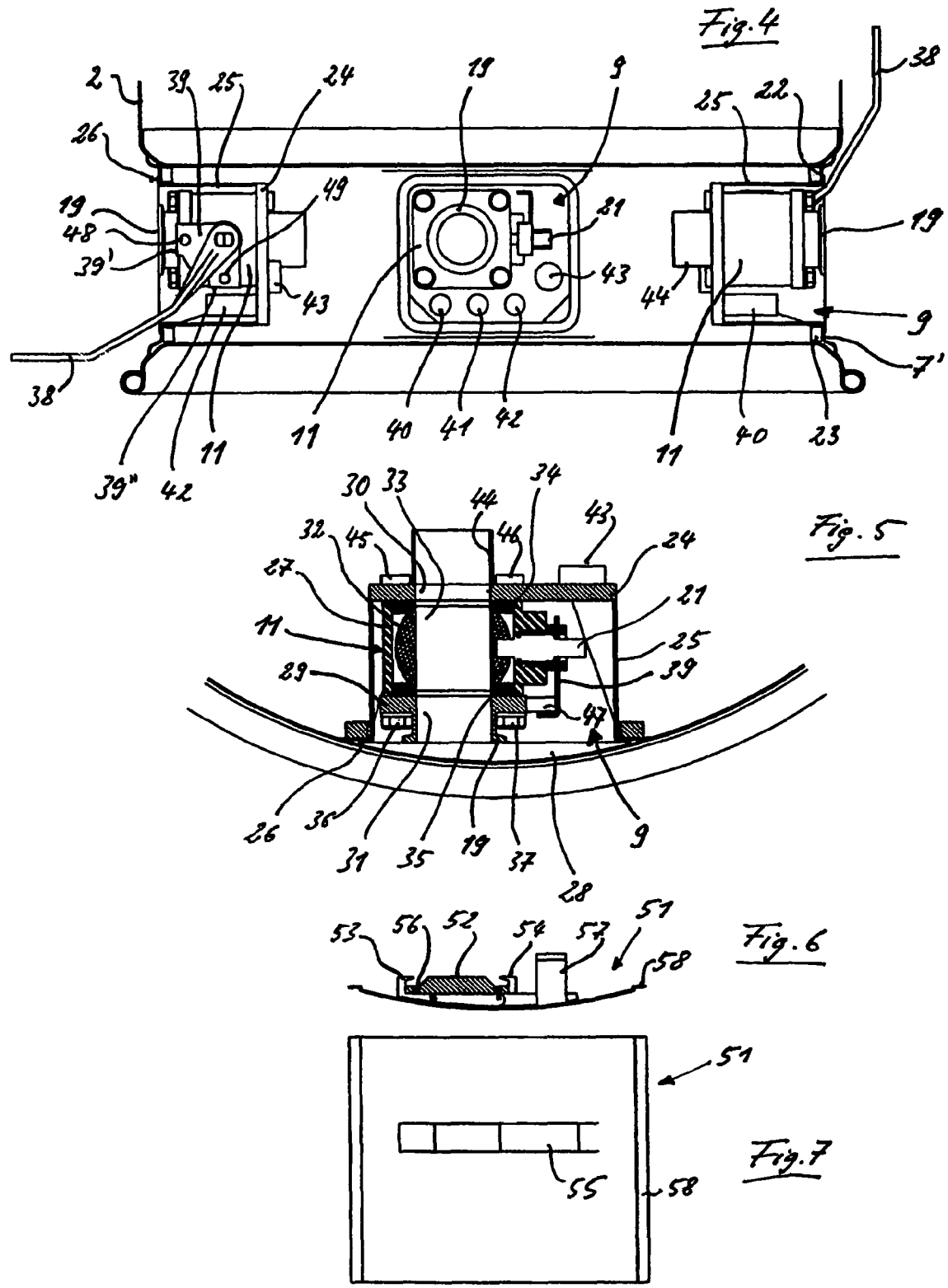

SORPTION COLUMN

This invention relates to a sorption column according to the preamble of claim 1.

Such a sorption column is known. Fastened to a cart is a base portion on which a column filled with sorbent and having a head portion is provided. The base portion and the head portion have as a waste gas inlet and a waste gas outlet in each case a pipe socket provided with a flange for fastening the ball valve.

However, the known sorption column is unsuitable in practice for cleaning waste gas with toxic substances, such as phosphine or arsine. For this purpose, the column must be transported to a special waste disposal facility when the sorbent is used up through toxic substance load. This requires a container approved for transporting hazardous materials, i.e. having in particular high break strength. This requirement is not met by the known sorption column if only because of the pipe sockets with the ball valves protruding away from the housing at a distance corresponding approximately to the container diameter.

With the known sorption column, the loaded sorbent in the column must therefore be decanted into approved transport containers. However, this involves a considerable danger of toxic gases escaping after the waste gas connections are opened, not least also due to air moisture entering the column, which can lead to the release of toxic gases.

EP 0 497 328 B1 discloses a sorption column which consists of at least three modules, namely a base portion, a vat with the sorbent, and a head portion. Base portion and head portion are provided with the waste gas connecting pieces. The vat has in the cover and in the bottom in each case a valve which is fitted together with a valve in the head portion or base portion, thereby connecting the base portion to the head portion. When the sorbent is exhausted, the vat is separated from the base portion and head portion, thereby closing the valves and permitting the vat to be disposed of.

This sorption column has proved useful. However, toxic gases can escape upon separation of the vat from the base and head portions. Also, reliable closing of the mating valves is not ensured when substances from the waste gas are deposited on the valves.

It is the problem of the invention to provide a reliably closing, simply constructed sorption column with high break strength.

This is obtained according to the invention by the sorption column characterized in claim 1. Advantageous embodiments of the invention are rendered in the sub-claims.

According to the invention, the sorption column has a vat-shaped housing. The housing circumferential wall is provided in the area of the housing bottom and the housing cover in each case with at least one depression for receiving a ball valve at the inlet for waste gas to be cleaned into the housing and at the outlet for cleaned waste gas out of the housing. Thus, the waste gas inlet and the waste gas outlet with the ball valve are protected. The inventive sorption column thus withstands the breaking and throwing test to which transport containers for hazardous materials are subjected for approval.

Commercially available ball valves are generally constructed from a housing which is sealed on each end wall with an end plate having a through bore for the fluid. The ball is likewise provided with a through bore which is flush with the through bores in the end plates when the valve is open. For closing the valve, the ball is rotatable by 90° with a shaft mounted tightly in the ball valve housing. For assembly, the end plates are tightened toward each other e.g. by threaded bolts, thereby pressing two sealing rings disposed between ball, ball valve housing and one and the other end plate, areally against the ball. Ball valves are therefore characterized by high tightness and reliability.

The ball valve is provided with a connection for a waste gas supply pipe or waste gas removal pipe. The connection can be formed e.g. by a flange on the through bore on the end plate of the ball valve facing the opening, which is pressable against a flange on the waste gas supply pipe or waste gas removal pipe e.g. with a spring optionally with a ring seal therebetween. Instead, a plug connection can be provided, e.g. a bush on the through bore on the end plate of the ball valve, into which a pipe socket is inserted, with one or more sealing rings on the circumference of the pipe socket. The connection can also be formed in another way, e.g. for a screw connection with the waste gas supply pipe or waste gas removal pipe.

To obtain optimal protection, the connection is also disposed so as to be shifted into the depression. That is, it can be flush with the housing circumferential wall of the sorption column, but should not project outwardly beyond it.

The housing circumferential wall of the sorption column can have a constriction or ring groove in the area of the depression for receiving the ball valve. Thus, the ball valve with the connection can be disposed so as to be shifted even further inwardly relative to the housing circumferential wall. At the same time, the ring groove obtains an additional stiffening of the vat, like a bead.

The length of the depression is preferably greater in the circumferential direction than its height in the axial direction. Thus, the shaft for actuating the ball can be so disposed as to protrude laterally, i.e. horizontally, into the depression out of the ball valve housing.

Preferably, the depression is formed by a pocket inserted into a recess in the housing circumferential wall of the sorption column. The pocket can for this purpose be welded gastight at its opening to the housing circumferential wall.

The wall of the pocket facing the inside of the sorption column, which is provided with a waste gas passage, is preferably formed as a plate to which the ball valve is fastened.

One of the two annular ball seals of the ball valve is preferably disposed between said plate-shaped wall of the pocket, the ball and the ball valve housing. Said plate-shaped wall thus replaces one end plate of a conventional ball valve. This additionally considerably reduces the overall height of the ball valve.

The second annular ball seal, however, is preferably disposed between the ball, the ball valve housing and an end plate of the ball valve which faces the opening of the pocket. Since said end plate permits assembly of the ball valve, the ball housing and the plate-shaped wall of the pocket which faces the inside of the sorption column can be formed in one piece. Since the pocket is preferably also formed in one piece with said plate-shaped wall, the pocket and the ball valve housing thus form one part which can be inserted as a whole into the recess in the housing circumferential wall of the sorption column. This facilitates assembly and obtains high tightness. For the same reasons, the end plate of the ball valve facing the pocket opening and the connection disposed thereon for the waste gas supply pipe or waste gas removal pipe are preferably also formed in one piece.

For fixing the ball valve on the plate-shaped inner wall of the pocket and for clamping together the plate-shaped inner wall and the end plate facing the pocket opening, clamp bolts can be provided. The clamp bolts can be formed as threaded bolts which penetrate both the end plate facing the pocket opening and the plate-shaped wall of the pocket, whereby nuts can be screwed onto the ends of the threaded bolts protruding out of the end plate and out of the plate-shaped wall, in order to clamp the plates on the two end walls of the ball valve housing. Also, one end of the threaded bolts can be screwed into a taphole in the plate-shaped wall of the pocket or said end plate, and optionally sealed gastight by welded caps.

To apply the torque required for actuating the ball valve, a long actuating lever is preferably used. So that the actuating lever protruding far out of the depression can be removed for transport of the sorption column, it is preferably connected detachably to the ball shaft of the ball valve. For this purpose, the free end of the ball shaft can be formed e.g. as a polygon onto which the actuating lever is slipped.

To avoid having to repeatedly slip on the actuating lever attacking the polygon, when the ball valve is to be opened or closed, the opening of the depression is so dimensioned that the ball shaft is rotatable with the actuating lever by at least 90°. That is, in the area of the horizontal ball shaft extending laterally away from the ball valve housing, the opening of the depression or pocket must have a sufficient height to permit the ball shaft to be rotated by at least 90° with the actuating lever.

The ball shaft of the ball valve preferably has a marking or the like to indicate the open and closed positions of the ball valve. For this purpose, it is possible for example to dispose nonrotatably on the ball shaft a disk which is provided with a corresponding display, e.g. "closed" and "open", which is visible in the closed and open positions.

Further, a device can be provided for fixing the closed and/or open position of the ball valve. The fixing device can be formed for example by a bar or similar locking element which engages e.g. an opening in a disk disposed nonrotatably on the ball shaft, for example said marking disk.

The depression can moreover have provided therein one or more gastightly disposed and optionally self-closing connections which lead into the inside of the sorption column. For example, a tube can lead from such a connection into the sorbent to make it possible to detect at a certain level, by gas sampling, how far the sorbent is exhausted.

If both the plate-shaped wall in the lower depression with the ball valve for the waste gas inlet and the plate-shaped wall of the upper depression with the ball valve for the waste gas outlet have such a connection, the differential pressure between inlet and outlet can be measured. Also, the temperature inside the sorption column can be controlled via said connections in the depression, for example by a cooling coil inside the sorption column, which is supplied e.g. with cooling water via said connections. Further, an inspection glass, for example, can be provided in the depression.

The opening of the depression is preferably closeable by a cover. The depression is thus protected from soil particles. At the same time, the cover also counteracts deposits which can form through decomposition of compounds in the waste gas in the outwardly facing connection of the ball valve. The cover is preferably fastenable to the connection for the waste gas supply pipe or waste gas removal pipe on the ball valve. The connection can thus for example have a flange, and the cover be provided on its inner side with spring clips which can be slipped on the flange and engage behind it in the slipped-on state so as to urge the cover against the housing circumferential wall to seal the depression.

Hereinafter the invention will be explained in more detail by way of example with reference to the enclosed drawing. The figures are described as follows:

FIG. 1 a perspective view of a sorption column with a sector cut out;

FIG. 2 a side view of the sorption column with partly broken-away parts;

FIG. 3 the detail A according to FIG. 2 in an enlarged rendition;

FIG. 4 the depression with the ball valve in the bottom area of the housing of the sorption column in a plan view as well as on the right and on the left in cross section;

FIG. 5 a longitudinal section through the ball valve according to FIG. 4 in an enlarged rendition; and FIGS. 6 and 7 a section and a plan view of a cover for the depression.

According to FIGS. 1 and 2, the sorption column consists of a vat-shaped housing 1 having a cylindrical circumferential wall 2, a bottom 3 and a cover 4. The bottom 3 and the cover 4 are each provided on the circumferential edge with a border 5, 6. Since the border 5 has a greater diameter than the border 6, the sorption column can have a further column safely stacked thereon.

In the area of the bottom 3 and the cover 4 the circumferential wall 2 has a ring groove 7, 8 in each case. Each ring groove 7, 8 has provided therein a depression 9, 10 in which a ball valve 11, 12 is provided for letting waste gas to be cleaned into the bottom area of the sorption column and letting cleaned waste gas out in the cover area. Above the ring groove 7 and below the ring groove 8 a perforated plate 13, 14 or similar permeable wall is provided in the housing 1. The solid absorbent (not shown in the drawing) is disposed between the perforated plates 13, 14.

To permit the cover 4 to be removed for filling and emptying the sorption column, the housing circumferential wall 2 is divided below the ring groove 8. According to FIG. 3, a ring seal 17 is provided for this purpose between a border 15 on the lower part of the housing circumferential wall and a border 16 engaging over the same on the part with the cover 4. A tension ring 18 is laid around the borders 15, 16 placed one on the other, thereby pressing the borders 15, 16 firmly together to ensure high tightness.

FIGS. 4 and 5 show only the waste gas inlet in the bottom area of the sorption column, but the waste gas outlet in the cover area is formed identically, so that the following statements on FIGS. 4 and 5 apply equally to the waste gas outlet in the cover area.

According to FIGS. 4 and 5, the ball valve 11 has as a waste gas connection 19 a flange to which a waste gas supply pipe (not shown) with a flange is connectable to form a flange joint. The connection 19 is disposed so as to be shifted into the depression 9 relative to the housing circumferential wall 2 of the sorption column, i.e. it is shifted inwardly relative to the groove bottom 7' of the ring groove 7.

As indicated in particular by the side view in FIG. 4, the ball valve 11 is disposed in the depression 9 so as to be shifted laterally, i.e. to the left, whereby the shaft 21 of the ball valve 11 extends in the depression 9 laterally away from the ball valve 11 horizontally.

The depression 9 is inserted into a recess 22 in the housing circumferential wall 2. For this purpose, the housing circumferential wall 2 is provided with a frame 23 around the recess 22. The depression 9 is formed substantially as a rectangular pocket. The depression 9 consists of a plate 24 which forms the wall facing the inside of the sorption column, and a connecting portion 25 which forms the area of the pocket between the plate 24 and the frame 23. The connecting portion 25 has a flange 26 which is for example welded to the frame 23.

According to FIG. 5, the ball valve 11 has a housing 27 which is closed by the plate 24 on one side, and by an end plate 29 on the side facing the pocket opening 28. The plate 24 and the end plate 29 each have a through bore 30, 31 which is flush with the through bore 33 of the ball 32 when the ball 32 is in the open position shown in FIG. 5. The ball 32 is nonrotatably connected to the shaft 21 mounted tightly in the ball valve housing 27 to permit the ball 32 to rotate between the open position shown in FIG. 5 and the closed position rotated by 90°. Between the ball 32, the ball valve housing 27 and the plate 24 or the end plate 29 there is in each case provided an annular seal 34, 35 which is pressed areally against the ball 32. The plate 24 and the end plate 29 are clamped together by screw bolts 36, 37, whereby FIG. 5 only shows the head of the screw bolts and not the shank.

For actuating the ball shaft 21, an actuating lever 38 is provided which can be slipped nonrotatably on the free end of the ball shaft 21, for example by a polygon connection. As evident from FIG. 4, the opening 28 of the depression 9 is so dimensioned that the ball shaft 21 is rotatable by 90° with the actuating lever 38.

An e.g. plate-shaped display 39 is provided nonrotatably on the ball shaft 21 to indicate the open and closed positions of the ball valve 11. For this purpose, the display 39 can be provided e.g. with "closed" on the edge 39' and with "open" or a corresponding marking on the edge 39".

As indicated in FIG. 4, the plate 24 has a plurality of connections 40 to 42 which are used for example for gas sampling from the inside of the sorption column, pressure measurement and the like, as well as an inspection glass 43.

Extending from the through bore 30 in the plate 24 is a pipe socket 44 protruding into the inside of the housing 1, onto which for example a diffuser can be slipped.

The tapholes for the screw bolts 36, 37 in the plate 24 are closed by gas-tightly welded metal caps 45, 46 (FIG. 5).

The connecting portion 25, the plate 24 and the ball valve housing 27 can also be formed in one piece.

The actuating lever 38 can also be of bipartite construction, i.e. having a part connected to the ball shaft 21 and extending maximally as far as the groove bottom 7', and a prolongation part protruding out of the groove 7. It is further possible to actuate the ball shaft 21 via a gearing, e.g. a toothed gearing.

FIG. 4 shows the ball valve 11 on the left side in the closed position and on the right side in the open position. The particular position can be fixable by a notch or the like, for example with a bolt 47 engaging one of the recesses 48, 49 in the plate 39.

The opening 28 of the depression 9 is closeable by a cover 51 which is shown in FIGS. 6 and 7. The depression 9 is thus protected from soil particles. At the same time, the cover prevents deposits through decomposition of waste gas in the connection with the through opening 31.

For this purpose, the cover 51 has on the inner side a centering piece 52 which is inserted into the opening 31 for closing. On both sides of the centering piece 52, claws 53, 54 are provided which engage behind the flange 19 for closing the opening 31. The claws 53, 54 are operable with a clamping lever 55 which is attached to the outer side of the cover 51. An O-ring 56 is provided on the circumference of the centering piece 52 for reliably sealing the dead volume in the through opening 31.

Further, provided on the inner side of the cover 51 is a safety projection 57 which is formed for engaging the depression 9 above the plate 39. Thus, the cover 51 can only be placed on the opening 28 of the depression 9 when the plate 39 assumes the position, shown on the left in FIG. 4, in which the ball valve 11 is closed.

The cover 51 has a flange 58 for fitting against the sorption column in the area of the frame 23.

The invention claimed is:

1. A sorption column for waste-gas cleaning comprising a vat-shaped housing for receiving a solid stationary sorbent, said vat-shaped housing including a housing circumferential wall defining a longitudinal axis, a waste gas inlet provided with an inlet ball valve for selectively controlling entry of waste gas to be cleaned into the housing, and a waste gas outlet provided with an outlet ball valve for selectively controlling exit of cleaned waste gas out of the housing, wherein the housing circumferential wall has in the area of a housing bottom, an inlet depression for receiving the inlet ball valve at the waste gas inlet and, in the area of a housing cover, the housing circumferential wall has an outlet depression for receiving the outlet ball valve at the waste gas outlet, said sorption column including a first permeable cylindrical plate disposed within the vat-shaped housing above the inlet depression to form a lower chamber with the housing bottom, the lower chamber connected to the inlet ball valve to receive waste gas therethrough, and a second permeable cylindrical plate disposed within the vat-shaped housing below the outlet depression to form an upper chamber with the housing cover, the upper chamber connected to the outlet ball valve to output cleaned waste gas therethrough, and a solid stationary sorbent disposed within a center chamber defined between the first and the second permeable cylindrical plates and within the circumferential wall of the housing, wherein the solid stationary sorbent is prevented from entering either of the lower chamber or the upper chamber.

2. The sorption column according to claim 1, wherein at least one of the inlet ball valve at the waste gas inlet for the lower chamber and the outlet ball valve at the waste gas outlet for the upper chamber has a connection for a waste gas supply pipe or a waste gas removal pipe, the connection being disposed so as to be located within the respective depression and inwardly with respect to an axially circumferential cylinder defined by the housing circumferential wall.

3. The sorption column according to claim 1, wherein the housing circumferential wall has in the area of each said depression a ring groove extending about the entire circumference thereof.

4. The sorption column according to claim 1, wherein a ball shaft of the inlet ball valve extends in the inlet depression laterally away from the inlet ball valve.

5. The sorption column according to claim 3, wherein each said depression is formed by a respective pocket inserted into a respective recess of each said ring groove.

6. The sorption column according to claim 5, wherein a wall of each said depression facing the inside of the housing comprises a plate-shaped inner wall provided with a through bore.

7. The sorption column according to claim 6, wherein one of two ball seals of one of said ball valves is disposed between a ball and the plate-shaped inner wall within a ball valve housing corresponding to one of the depressions.

8. The sorption column according to claim 7, wherein the other ball seal of the one said ball valve is disposed between the ball and an end plate facing the opening of the depression, said end plate supporting a connection for one of a waste gas supply pipe or a waste gas removal pipe.

9. The sorption column according to claim 8, wherein the ball valve housing and the plate-shaped wall or the end plate with the connection for the waste gas supply pipe or waste gas removal pipe, are formed in one monolithic piece.

10. The sorption column according to claim 8, wherein the end plate and the connection for the waste gas supply pipe or the waste gas removal pipe, are formed in one monolithic piece.

11. The sorption column according to claim 7, including clamp bolts provided for fixing each said ball valve on the respective plate-shaped inner wall of the respective depression and for clamping together the plate-shaped inner wall and a respective end plate with a respective connection on the other end wall of the respective ball valve housing.

12. The sorption column according to claim 1, including an actuating lever detachably connectable to a ball shaft of one of the ball valves for enabling selective control of the one ball valve between an open and a closed position.

13. The sorption column according to claim 12, wherein an opening of the corresponding depression is dimensioned so that the ball shaft is rotatable by at least 90° with the actuating lever.

14. The sorption column according to claim 12, wherein the ball shaft is provided with a display which indicates open and closed positions of the ball valve.

15. The sorption column according to claim 14, including a device for maintaining the closed or open position of the ball valve.

16. The sorption column according to claim 1, including a depression cover mountable onto the housing for closing the opening of one said depression.

17. The sorption column according to claim 16, including a connection for at least one said ball valve, and wherein the depression cover is detachably fastenable to the connection so that the one said depression is covered with the depression cover which corresponds to the shape of the circumferential wall of the housing.

18. A sorption column for waste-gas cleaning comprising:
an elongate generally cylindrical housing for receiving a solid stationary sorbent, said housing comprising a circumferential wall defining a longitudinal axis, a housing bottom and a housing cover, said housing including a first depression in said circumferential wall near the housing bottom and a second depression in said circumferential wall near the housing cover;
a first permeable cylindrical plate disposed within the cylindrical housing above the first depression, the first permeable cylindrical plate, in combination with the housing bottom and the circumferential wall, forming a lower chamber of the housing;
a first manually actuatable ball valve having a first connection joined thereto, the first ball valve and the first connection disposed in the inlet depression for selectively providing a substantially linear flow path into or out of the lower chamber of the housing, the linear flow path being transverse to the longitudinal axis of said elongate housing;
a second permeable cylindrical plate disposed within the cylindrical housing below the second depression, the second permeable cylindrical plate, in combination with the housing cover and the circumferential wall, forming an upper chamber of the housing;
a second manually actuatable ball valve having a second connection joined thereto, the second ball valve and the second connection disposed in the second depression for selectively providing a substantially linear flow path into or out of the upper chamber of the housing, the linear flow path being transverse to the longitudinal axis of said elongate housing; and
a solid stationary sorbent disposed within a center chamber defined between the first and the second permeable cylindrical plates and the circumferential wall of the housing, the first and second permeable cylindrical plates maintaining the solid stationary sorbent away from the lower chamber and the upper chamber.

19. The sorption column according to claim 18, wherein the first connection comprises an inlet connection joined to the first ball valve, which comprises an inlet ball valve disposed within the first depression, which comprises an inlet depression, wherein the inlet depression prevents the inlet connection from projecting beyond a cylindrical shape defined by the circumferential wall of the housing; and
wherein the second connection comprises an outlet connection joined to the second ball valve, which comprises an outlet ball valve disposed within the second depression, which comprises an outlet depression, wherein the outlet depression prevents the outlet connection from projecting radially outwardly beyond the cylindrical shape defined by the circumferential wall of the housing.

20. The sorption column of claim 19, comprising:
an inlet cover for securement to the inlet connection of the inlet ball valve, the cover including a centering piece for seating within an inlet throughbore of the inlet connection, wherein the inlet connection comprises a flange extending about the inlet throughbore, the inlet cover including claws for engaging about the outer periphery of the flange of the inlet connection to seal the throughbore with the centering piece and for securing the inlet cover over the inlet depression without the inlet cover protruding outwardly beyond the cylindrical shape defined by the circumferential wall of the housing; and
an outlet cover for securement to the outlet connection of the outlet ball valve, the outlet cover including a centering piece for seating within an outlet throughbore of the outlet connection, wherein the outlet connection comprises a flange extending about the outlet throughbore, the outlet cover including claws for engaging about the outer periphery of the flange of the outlet connection to seal the throughbore with the centering piece and for securing the outlet cover over the outlet depression without the outlet cover protruding outwardly beyond the cylindrical shape defined by the circumferential wall of the housing,
wherein the sorption column is capable of being transported with hazardous materials stored therein, as the inlet cover and the outlet cover enclosing the respective said inlet and outlet depressions to protect the ball valves that do not protrude radially outwardly beyond the cylindrical shape defined by the circumferential wall of the housing, wherein the sorption column comprises an essentially cylindrical shaped column having the inlet and outlet covers secured thereto.

21. A sorption column for waste-gas cleaning comprising:
an elongate generally cylindrical housing defining a longitudinal axis, said housing comprising a circumferential wall, a generally flat housing bottom and a generally flat housing cover, said housing including a first depression in said circumferential wall adjacent the housing bottom and a second depression in said circumferential wall adjacent the housing cover;
a first permeable cylindrical plate disposed within the cylindrical housing above the first depression, the first permeable cylindrical plate with the housing bottom and the circumferential wall forming a lower chamber;
a manually actuatable first ball valve disposed in the first depression for selectively providing a flow path for gas into or out of the lower chamber;
a second permeable cylindrical plate disposed within the cylindrical housing below the second depression, the second permeable cylindrical plate with the housing cover and the circumferential wall forming an upper chamber;

a manually actuatable second ball valve disposed in the second depression for selectively providing a flow path for gas into or out of the upper chamber; and a solid stationary sorbent disposed within a center chamber defined between the first and the second permeable cylindrical plates and the circumferential wall of the housing, the first and second permeable cylindrical plates preventing the solid stationary sorbent from entering the lower chamber or entering the upper chamber.

22. The sorption column according to claim 21, wherein the sorption column is configured for connecting a waste gas supply pipe to the lower chamber through the first ball valve, which comprises an inlet ball valve, and the sorption column is configured for connecting a cleaned waste gas removal pipe to the upper chamber through the second ball valve, which comprises an outlet ball valve, and wherein in operation with the inlet ball valve and the outlet ball valve each in an open position, waste gas enters into the lower chamber, advances through the sorbent disposed in the center chamber, enters into the upper chamber, and exits from the upper chamber through a cleaned waste gas removal pipe.

23. The sorption column according to claim 21, comprising:

an inlet connection joined to the first ball valve disposed in the first depression, the inlet connection being disposed within the first depression to avoid projecting radially beyond a circumferential cylinder defined by the circumferential wall of the housing;

an outlet connection joined to the second ball valve disposed in the second depression, the outlet connection being disposed within the second depression to avoid projecting radially beyond the circumferential cylinder defined by the circumferential wall of the housing;

an inlet cover for securement to the inlet connection of the first ball valve, the inlet cover including claws for engaging about the outer periphery of a flange of the inlet connection for securing the inlet cover over the first depression without the inlet cover protruding outwardly beyond the circumferential cylinder defined by the circumferential wall of the housing; and an outlet cover for securement to the outlet connection of the second ball valve, the outlet cover including claws for engaging about the outer periphery of a flange of the outlet connection for securing the outlet cover over the second depression without the outlet cover protruding outwardly beyond the circumferential cylinder defined by the circumferential wall of the housing, wherein the sorption column is capable of being transported with hazardous materials stored therein, as the inlet cover and the outlet cover enclosing the respective said first and second depressions protect the respective said ball valves during transport.

* * * * *